United States Patent [19]

Swamy

[11] Patent Number: 5,623,594

[45] Date of Patent: Apr. 22, 1997

[54] EMBEDDED THERMISTOR FOR ON-BOARD THERMAL MONITORING OF ELECTRICAL COMPONENTS

[75] Inventor: Deepak Swamy, Austin, Tex.

[73] Assignee: Dell USA, L.P., Austin, Tex.

[21] Appl. No.: 588,152

[22] Filed: Jan. 18, 1996

Related U.S. Application Data

[63] Continuation of Ser. No. 200,267, Feb. 23, 1994, abandoned.

[51] Int. Cl.[6] .................................................. G06F 11/34
[52] U.S. Cl. ........................................... 395/180; 364/557
[58] Field of Search ................................... 395/180, 181, 395/184.01, 185.01; 364/500, 557; 340/500, 501, 540, 584, 588; 331/176

[56] References Cited

U.S. PATENT DOCUMENTS

| | | | |
|---|---|---|---|
| 4,587,595 | 5/1986 | Staples | 361/388 |
| 4,848,090 | 7/1989 | Peters | 62/3.3 |
| 5,193,912 | 3/1993 | Saunders | 374/179 |
| 5,257,532 | 11/1993 | Hayakawa et al. | 364/556 |

OTHER PUBLICATIONS

Sorin et al. "Enhanced Heat Transfer For Electronic Devices Operating Inside Enclosures" 1992 IEEE, pp. 95–96.

Gromoll "Advanced Micro Air–Cooling Systems for High Density Packaging" 1994 IEEE, pp. 53–58.

Brewster et al. "Thermal Analysis of a Substrate with Power Dissipation in the Vias" 1992 IEEE, pp. 667–674.

Primary Examiner—Robert W. Beausoliel, Jr.
Assistant Examiner—Albert Decady
Attorney, Agent, or Firm—Henry N. Garrana; Mark P. Kahler; Diana L. Roberts

[57] ABSTRACT

A system and method for monitoring the temperature of a heat-producing electronic component located on a circuit board and a method of manufacturing therefor. The system includes: (1) an electrically-conductive trace of predetermined dimensions formed integrally with the circuit board, the trace having a temperature-dependent electrical property, a temperature of the electronic component affecting the electrical property and (2) an overtemperature detection circuit coupled to the trace for measuring the electrical property. The detection circuit provides, in response thereto, an overtemperature signal to thereby indicate that the temperature of the electronic component has exceeded a predetermined level. Preferably, the system is used to protect a microprocessor in a personal computer ("PC") from overheating.

27 Claims, 3 Drawing Sheets

EMBEDDED THERMISTOR FOR ON-BOARD THERMAL MONITORING OF ELECTRICAL COMPONENTS

This application is a continuation of application Ser. No. 08/200,267 filed Feb. 23, 1994 now abandoned.

The present invention is directed generally to a cooling system for computer apparatus, and more particularly relates to an electrically conductive trace integrally formed in the circuit board of a computer apparatus for monitoring the temperature of a heat-producing electronic component mounted on the board.

BACKGROUND OF THE INVENTION

Of all components in a computer, the central processing unit ("CPU") typically emits the most heat during operation of the computer. This heat is generated because the CPU is the electrical center of the computer. As computer systems grow in speed and shrink in size, power consumed by the CPU per unit volume (power density) increases dramatically. Thus, it becomes evermore important to dissipate the heat generated by the CPU and other heat-intensive components within the computer during operation to ensure that the components remain within their normal operating temperature ranges. Dissipation of heat reduces the chance that the components will fail immediately or have too short a lifetime.

In early desktop personal computers ("PCs"), components were passively cooled by radiation or convection, the surfaces of the components themselves interfacing directly with still air surrounding the component to transfer heat thereto. Unfortunately, air is not a particularly good conductor of heat. Therefore, in the early desktop PCs, the heated air tended to become trapped, clinging as a boundary layer to the components, acting as a thermal insulator and increasing component operating temperature. Eventually, PCs were provided with fans to force air over the surfaces of the components, removing the boundary layer and increasing the temperature differential between the surface of the component and the surrounding air to increase the efficiency of heat transfer. The increased temperature differential overcame some of the poor heat-conducting qualities of air.

As CPU power density continues to grow, it has become common to associate a heat sink with the CPU to increase the heat-dissipating surface area of the CPU for more effective cooling. Such heat sinks have a plurality of heat-dissipating projections or elements on an upper surface thereof. Lower surface of the heat sink is placed proximate the component and a retention clip is employed to wrap around the heat sink, gripping a lower surface of the component with inward-facing projections.

All of the previously discussed cooling methods, however, are premised on the condition that the ambient environmental temperature about the PC is sufficiently low to allow effective heat transfer to take place. For example, if the computer is in an excessively warm environment, there is not a sufficient temperature differential between the environment and the electrical components to effect a cooling of the components. As is well known, heat transfer is a function of temperature differential; and the narrower the differential, the less heat is transferred. Thus, these prior art cooling methods become inadequate to protect the CPU when the ambient environmental temperatures get too high.

In recognition of this problem, the prior art has provided an overtemperature-detection circuit employing a thermocouple that is constructed of layers of different metals. When the thermocouple is subjected to a temperature change, an electromotive force is produced. Electrical leads couple the thermocouple to a current-detection circuit that computes the thermocouple's temperature, thereby detecting indirectly the temperature of the microprocessor. However, this prior art technique suffers from time and cost problems. Thermocouples are expensive, and are yet another component that has to be purchased and installed on the circuit board of the PC, thereby increasing cost and the time it takes to manufacture the PC. In addition, the thermocouple is yet another component of the PC that is subject to failure.

Thus, what is needed in the art is a more time-efficient and cost-effective technique for detecting CPU temperature.

SUMMARY OF THE INVENTION

To address the above-discussed deficiencies of the prior art, it is a primary object of the present invention to provide an overtemperature protection circuit and method for board-mounted electronic components without having to mount separate heat-detecting components on the board.

Accordingly, the present invention provides a system and method for monitoring the temperature of a heat-producing electronic component located on a circuit board and a method of manufacturing therefor. The system comprises: (1) an electrically-conductive trace of predetermined dimensions formed integrally with the circuit board, the trace having a temperature-dependent electrical property, a temperature of the electronic component affecting the electrical property and (2) an overtemperature detection circuit coupled to the trace for measuring the electrical property, the detection circuit providing, in response thereto, an overtemperature signal to thereby indicate that the temperature of the electronic component has exceeded a predetermined level. In effect, the trace acts as a thermistor.

In a preferred embodiment, the overtemperature detection circuit comprises a series of instructions operable on a CPU and further comprises an overtemperature protection circuit for receiving those instructions and attempting to reduce the temperature of the electronic component. The circuit may attempt to accomplish the temperature reduction in one of several ways. For instance, the circuit may send a visual or audible warning signal to the user. The visual signal may take the form of displayed or printed message, or it may take the form of a flashing indicator light to warn the user that overheating is eminent. Alternatively, the circuit may send electronic instructions to a fan that is positioned to blow air over the electronic component to turn on or speed up to thereby cool the component. The circuit may also send an electronic signal to the electronic component's clock source to reduce the operating speed of the electronic component.

In a more preferred embodiment, the system is a PC with a microprocessor CPU and the overtemperature detection circuit comprises an analog-to-digital conversion circuit for converting the electrical property to a corresponding binary representation. The overtemperature detection circuit computes a temperature of the trace with reference to a physical constant stored in a memory device associated with the system. Preferably, the trace is comprised of metal and is located adjacent the CPU. More preferably, however, the trace is positioned directly underneath the CPU and is formed in a serpentine pattern to increase its length and thereby magnify its temperature-dependent qualities. The pattern may take the form of any one of a vast array of shapes and designs that can be varied to increase the length of the trace and yet remain within the footprint of the CPU, i.e. the area of the board that is covered by the CPU.

3

The foregoing has outlined rather broadly the features and technical advantages of the present invention so that the detailed description of the invention that follows may be better understood. Additional features and advantages of the invention will be described hereinafter which form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

The present invention provides a method and system for monitoring the temperature of a heat-producing electronic component located on a circuit board and a method for manufacturing that system.

Figure 1:
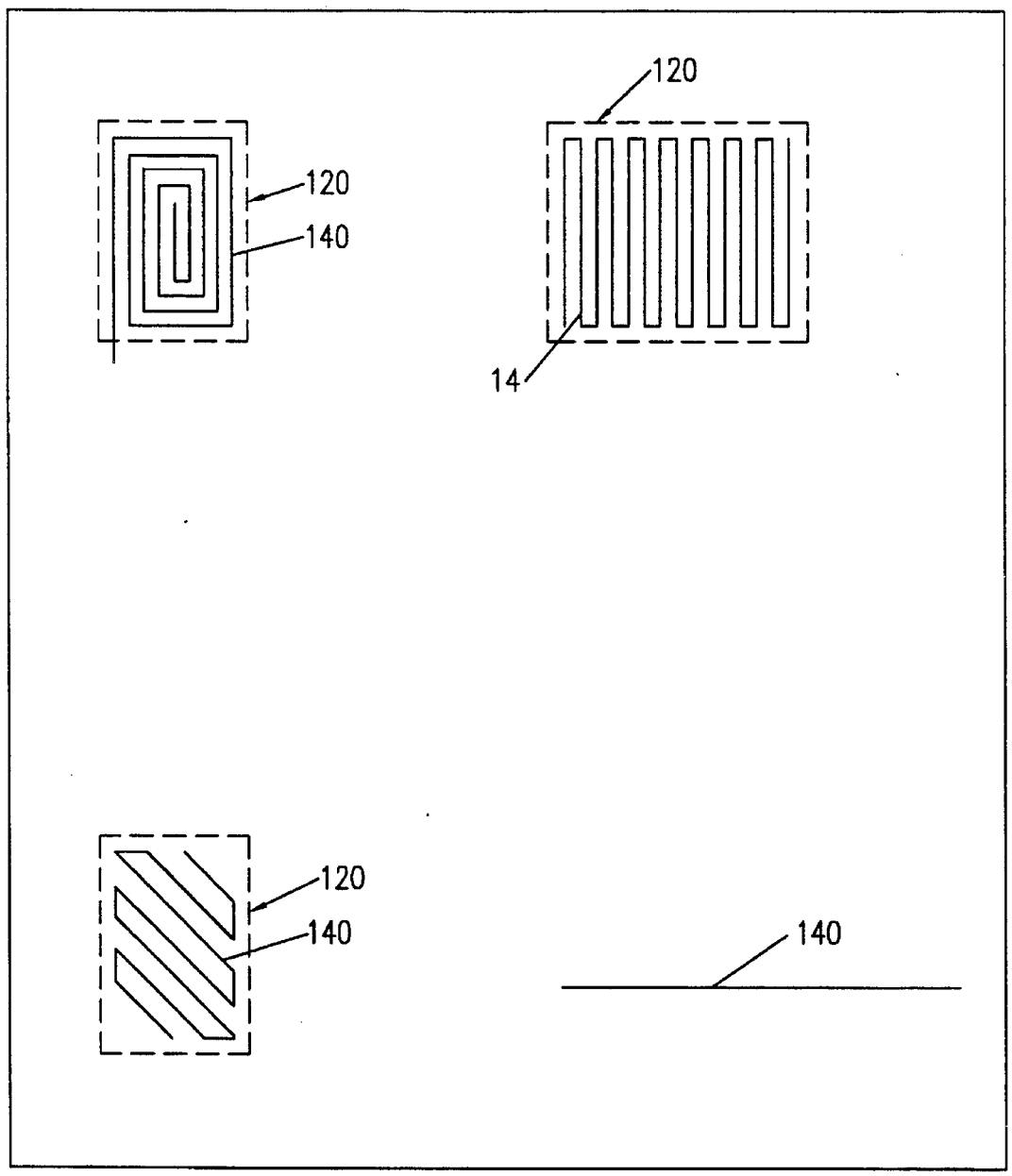
FIG. 1 illustrates an overhead view of a circuit board having heat-producing electronic components shown in broken line and traces integrally formed in the board.

Referring initially to FIG. 1, illustrated is an overhead view of a circuit board 100 having heat-producing electronic components 120 located thereon shown in broken line and traces 140 integrally formed in the board 100. The circuit board 100 may be any conventional board on which heat-producing electronic components are placed. For instance, the circuit board 100 may be a printed wiring board ("PWB") of the type commonly used in a PC. The electronic components 120 may be any type of electronic component and either analog or digital that requires cooling to function properly. Depending on the particular design and purpose, the board 100 may have one or a plurality of these components 120 located on it. In a preferred embodiment, however, one of the components 120 is a microprocessor CPU of the type used in a PC. The components 120 are mechanically coupled to the circuit board 100 by conventional means and are also electrically coupled to, among other things, a power source by a power pin (not shown).

Formed integrally with the circuit board 100 is an electrically-conductive trace 140 having predetermined dimensions (i.e. length, width, and depth). The trace 140 has a temperature-dependent electrical property, which varies as a function of the trace's temperature. In the illustrated embodiment, that property is resistance. During operation of the circuit board 100, the trace 140 receives heat from the electronic component 120. As the component's heat is transferred to the trace 140, the electrical property of the trace 140 changes as a function of the increase in temperature. This change in the electrical property provides a means by which the temperature of the electronic component 120 can be monitored. While the trace 140 may be positioned anywhere on the circuit board 100, it is desirable that the trace 140 be located adjacent the heat-producing component,

4 and more preferably, be located underneath the electronic component 120. The trace 140 may be a single metal or a combination of metals, however, in a preferred embodiment, the trace 140 is copper metal. The trace 140 may be integrally formed in the circuit board 100 by conventional means such as a photoresist-chemical wash process. Thus, the temperature sensing trace 140 may be formed simultaneously with other traces patterns. This greatly reduces the cost and manufacturing time of the temperature monitoring system when compared to other designs that use thermocouples that must be individually purchased or manufactured and placed on the circuit board 100.

In a conventional photoresist-chemical wash process, a circuit board is comprised of a base layer of non-conducting substrate material over which is deposited a conducting layer of material. The conducting layer is then coated with a photoresist chemical and covered with a mask having the desired pattern of traces defined in the mask. The masked layer is then exposed to a light source selectively exposing the photoresist chemical to the light. Afterwards, the circuit board is washed with a chemical that dissolves all of the conducting material expect for that portion of the material exposed to the light through the mask. This, in turn, leaves only a conductive trace pattern remaining on the substrate.

As previously mentioned, it is preferred that the trace 140 be located underneath the heat-producing component 120. When so positioned, it is desirable that the length of the trace 140 cover as much of the component's square area (i.e. footprint) as possible to amplify its temperature sensitivity and to obtain a good average resistance. In the present invention, the trace 140 may be formed in any pattern desired. However, it is preferable that the trace 140 be formed in a serpentine pattern that gives it a maximum length with respect to the square area covered by the electronic component 120. For instance, the pattern may be a spiralled rectangle shape, a repeating series of vertical lines, a repeating zig-zag shape, or alternatively, a straight line, as illustrated in FIG. 1. While the length of the trace 140 can be made fairly consistent from board to board, the width and depth (thickness) of the trace may vary. Nevertheless, the temperature as a function of the trace's resistance can still be accurately determined as shown by the following data and discussion.

Experimental Results

It is well known that for a conductor of known length and cross sectional area, R=r(L/A), where R=resistance, r=electrical resistivity of the conductor being used, L=length of the conductor and A=the cross sectional area of the conductor. In addition, for a given conductor of known length and cross sectional area, $R_T$=Ro (1+aT), where $R_T$=resistance at temperature T, Ro=resistance at initial temperature and a=A temperature compensation coefficient. Experimental data was observed for a typical copper conductor, 7 mils thick and one inch long at 20° C., in TABLE I as follows:

TABLE I

|  | Nominal | High | Low |
| --- | --- | --- | --- |
| Width (") | 0.007 | 0.0075 | 0.0065 |
| Depth (") | 0.0021 | 0.0022 | 0.002 |
| Area ("$^2$) | 0.0000147 | 0.0000165 | 0.000013 |
| r | 7.09E-07 | 7.09E-07 | 7.09E-07 |
| R(mOhms) | 48.20825968 | 42.94917681 | 54.51241672 |

As reflected by TABLE I above, three cases of process variation have been considered: a nominal line, a typical overplated, under-etched line (High) and a typical underplated over-etched line (Low). Using the temperature compensation formula set forth earlier, the resistances of these 3 cases over a temperature range is shown below in TABLE II.

TABLE II

| Resis/Temp. | Nominal | High | Low |
| --- | --- | --- | --- |
| R (20° C.) | 48.20825968 | 42.94917681 | 54.51241672 |
| R (30° C.) | 58.04274466 | 51.71080888 | 65.63294973 |
| R (40° C.) | 61.32090632 | 54.6313529 | 69.33979406 |
| R (50° C.) | 64.59906797 | 57.55189692 | 73.0466384 |
| R (60° C.) | 67.87722963 | 60.47244094 | 76.75348274 |
| R (70° C.) | 71.15539129 | 63.39298497 | 80.46032707 |
| R (80° C.) | 74.43355295 | 66.31352899 | 84.16717141 |

TABLE III

| Rt/Ro | Nominal | High | Low |
| --- | --- | --- | --- |
| Rt/Ro (20° C.) | 1 | 1 | 1 |
| Rt/Ro (30° C.) | 1.204 | 1.204 | 1.204 |
| Rt/Ro (40° C.) | 1.272 | 1.272 | 1.272 |
| Rt/Ro (50° C.) | 1.34 | 1.34 | 1.34 |
| Rt/Ro (60° C.) | 1.408 | 1.408 | 1.408 |
| Rt/Ro (70° C.) | 1.476 | 1.476 | 1.476 |
| Rt/Ro (80° C.) | 1.544 | 1.544 | 1.544 |

As shown in TABLE III, the resistance distribution due to a 10 degree temperature gradient (TABLE II) and those distributions due to process variations (TABLE I) have some commonalty. To overcome the variation in resistance that is likely to occur from board to board as a result of manufacturing variations, the present invention employs a ratio of change in resistance from one temperature to another as the control variable. As can be seen in TABLE III, in all three cases, the Rt/Ro ratio is the same for a given temperature and is different from that of other temperatures. It is worth noting that, after an initial surge in the first degree rise, the response is linear and equal to the temperature compensation coefficient for copper, aCu, 0.0628/° C. This predictable linearity can enable accurate control. Due to the fact that the control variable is based on a ratio as opposed to an absolute value, dimensional variations induced by etching and plating process variations during the manufacturing process may be overcome. Once a board is manufactured, Ro and To must be determined and stored in the PC's memory, allowing a correct assessment of trace temperature to be made.

In a preferred embodiment of the present invention, one end of the trace 140 is coupled to a voltage source and the othe end is coupled to an overtemperature detection circuit. In most instances, the trace 140 may be coupled to the same power pin that supplies power to the heat-producing electronic component 120 or it may be coupled to a completely separate power source, if so desired. The purpose of the power source is to supply the one end of the trace 140 with a constant voltage. As the temperature of the trace 140 increases, the trace's electrical property changes. Different electrical properties may be used to monitor the temperature of the electronic components 120. For instance, the electrical property used may be resistance. In such instances, the temperature of the electronic components 120 can be determined as a function of resistance since, as the temperature of the trace 140 increases, the resistance also increases. The increase in resistance may be measured directly from the trace 140 as an analog signal. In the alternative, the electrical property used may be a voltage differential existing over the length of the trace 140, which is dependent on the resistance and thus the temperature. The voltage differential may also be measured directly from the trace 140 as an analog signal. Whichever electrical property is used, the analog signal is then transmitted from the trace 140 to an overtemperature detection circuit 210 (see FIG. 2) for measuring the electrical property of the trace 140. The overtemperature detection circuit 210 then provides an overtemperature signal to effect a response action.

In a more preferred embodiment of the present invention, the trace 140 has a first end connected to the same power pin that supplies power to the electronic components 120 and a second end. The power pin supplies the trace 140 with a constant voltage, and as the temperature of the trace 140 increases, the resistance of the trace 140 also increases which, in turn, forms a voltage differential between the first and second ends of the trace 140. The analog voltage differential signal is then transmitted to an analog-to-digital converter circuit 220 coupled to the trace 140 where it is converted to a binary representation. This digital signal is then transmitted to an overtemperature detection circuit where a corresponding temperature is computed and an overtemperature signal is provided when the temperature exceeds a predetermined level. The overtemperature signal is then transmitted to an overtemperature protection circuit 230 that attempts to reduce the temperature of the electronic components 120 through various means.

The overtemperature detection circuit 210 of the present invention (FIG. 2) may be any conventional circuit for measuring the electrical property transmitted from the trace 140, determining a corresponding temperature and providing an overtemperature signal to indicate that the temperature of the electronic component 120 has exceeded a predetermined level. Preferably, the overtemperature detection circuit 210 includes the analog-to-digital converter circuit 220 (FIG. 2) that converts the trace's analog signal to a binary representation.

The overtemperature circuit 210 may also be embodied as a series of instructions operable on a microprocessor of the type typically found in a PC, which includes a reference to a physical constant, stored in a memory device associated with the system. Additionally, the overtemperature circuit 210 may also include the overtemperature protection circuit 230 (FIG. 2) for receiving the overtemperature signal and for attempting to reduce the temperature of the electronic component 120. What is meant by the phrase "attempting to reduce" is that in some cases, the overtemperature protection circuit 230 may only send a warning signal of some type to the user in the form of a flashing indicator light or a message on a video screen. In such instances, it is up to the user to take appropriate action to reduce the temperature of the components 120, i.e., the overtemperature protection circuit 230 cannot take any further action other than warning the user. Thus the circuit 230 has "attempted to reduce" the temperature by warning the user. However, in other embodiments, the overtemperature protection circuit 230 may send a signal to turn on a fan 240 (FIG. 2) or increase the fan's speed if the fan 240 is already on. Additionally, the overtemperature protection circuit 230 may also send a signal to the microprocessor's clock 250 (FIG. 2) to thereby decrease the microprocessor clock's operational speed. If the ambient environmental temperature is too high, however, such cooling measures may be nothing more than "attempts to reduce." The attempts previously discussed can be programmed to occur in several different combinations and may also include additional steps such as saving the current document and subsequently shutting down the operation of the microprocessor 260. Having described various apparatus embodiments of the present invention, the method of operation will now be discussed.

Figure 2:
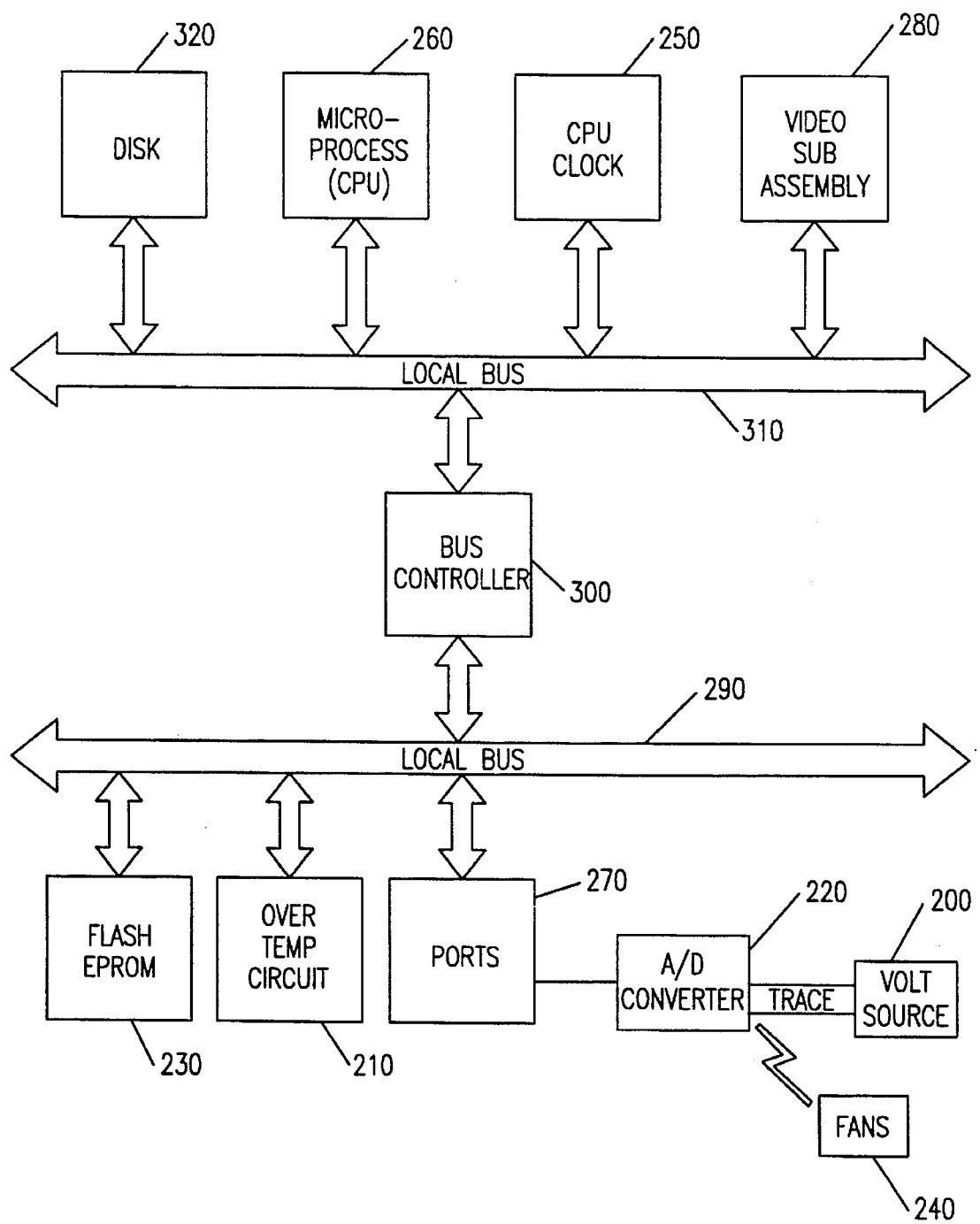
FIG. 2 illustrates a block diagram of a computer architecture embodying the present invention.

Turning now to FIG. 2, illustrated is a block diagram of a computer architecture illustrating one embodiment of the present invention. During the operation of a typical PC, the CPU may operate at very high frequency. If the ambient temperature is sufficiently high, the heat from the CPU will not dissipate at a rate sufficient to cool the CPU adequately. Throughout the operation of the CPU, the overtemperature detection circuit 210 takes periodic readings of the CPU's operating temperature. As the operating temperature of the CPU increases, the heat from the CPU 260 causes the temperature of the trace 140 to increase, thereby increasing the trace's resistance. This higher resistance causes a voltage drop or voltage differential between the first end that is connected to the voltage soure 200 and the second end of the trace 140. The lower voltage is transmitted to the A/D converter circuit 220 where it is converted into a digital signal. The signal is gated in the port 270 and is read by the overtemperature detection circuit 210 through the expansion bus 290. The overtemperature circuit 210 computes the temperature by comparing the original resistance and temperature (Ro, To) of the trace 140 that is stored in the electrically erasable programmable read-only memory ("EEPROM" or "FLASH EEPROM") 230 with the digitized voltage signal received from the trace 140. If the computed temperature exceeds a predetermined maximum allowed temperature, the overtemperature detection circuit 210 sends a signal through the expansion bus 290 to the bus controller 300 and the local bus 310 to one of several components. The component to which the signal is sent may depend on how extreme the temperature of the CPU 260 has become and how long the temperature has been at the excessive level. For example, the signal may instruct the fan 240 to turn on or increase speed if already on. Alternatively, the signal may send a message to the user through the video subsystem 280, or it may instruct the CPU clock 250 to decrease the operational speed of the CPU 260. As a last resort, the signal may instruct the CPU 260 to save the document presently being worked on to the disk 320 and turn the power to the PC off. The detailed method of operation of this system will now be discussed in detail.

Figure 3:
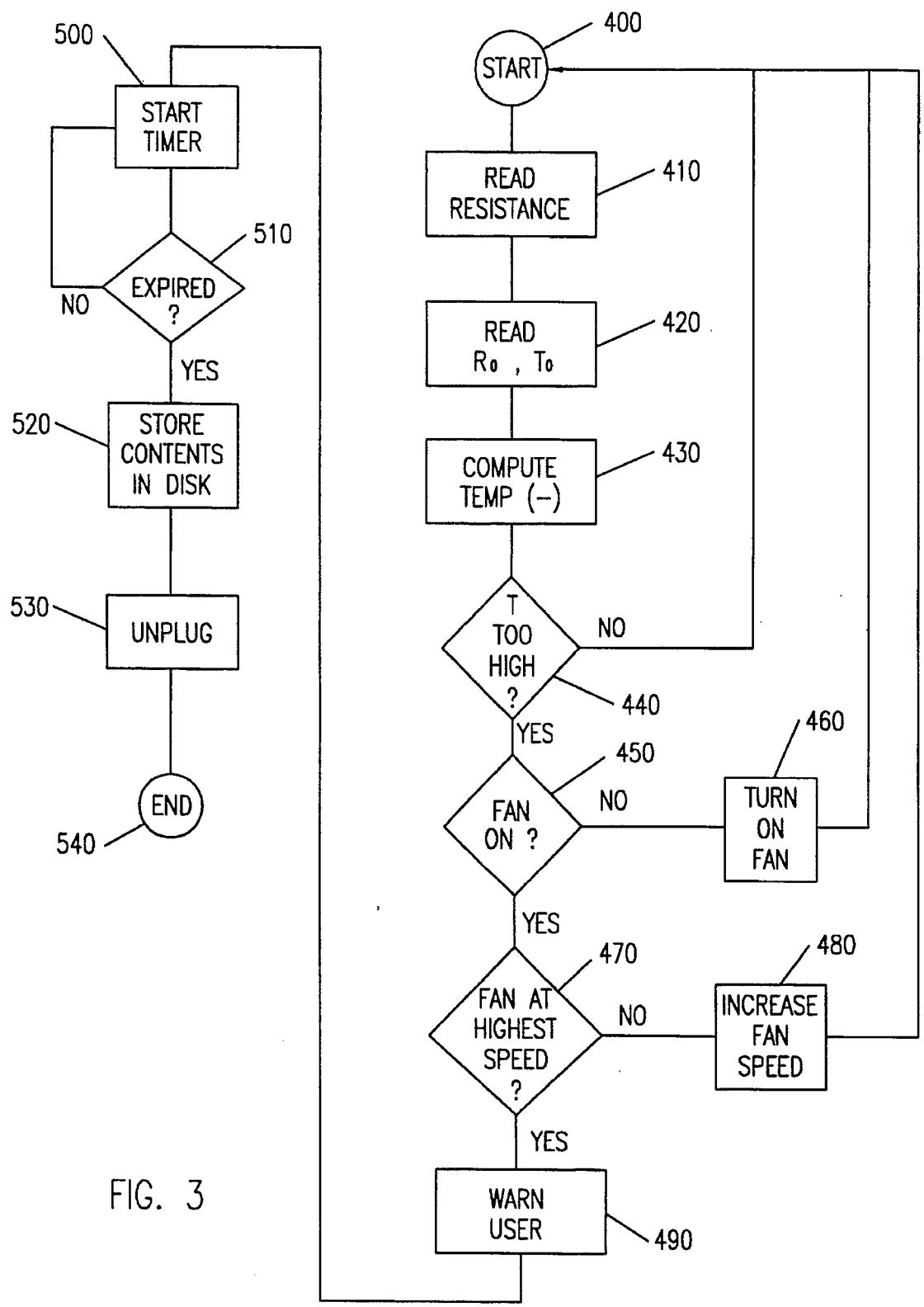
FIG. 3 illustrates a flow diagram of the method of operation of the present invention.

Turning now to FIG. 3, illustrated is a flow diagram of the method of operation of one embodiment of the present invention. The power source to the PC is turned on (in a circle 400) and the CPU begins its operation. As the CPU is operating, the resistance from the trace is converted into a digital signal by the analog-to-digital converter and is read by the overtemperature detection circuit (in a block 410). The physical constants Ro and To are read from the FLASH EEPROM (in a block 420) by the overtemperature circuit and a temperature T is then computed (in a block 430). If T is not too high another reading is taken on a predetermined periodic basis. However, if T is too high (in a decisional block 440), an instructional signal may be transmitted from the overtemperature circuit to a fan (in a decisional block 450) If the fan is not on, the instructional signal may cause the fan to turn on (in a block 460) However, if the fan is already on, the instructional signal may then cause the fan to increase in speed (in a decisional block 470 and block 480). If the fan is already on at its highest speed and T is still too high, the overtemperature circuit may send an instructional signal to the video subsystem to warn the user by displaying a message on the screen, flashing a warning signal, or both (in a block 490).

After each instructional message, a new reading is periodically taken and the operations illustrated by the flow diagram are repeated as shown. After the user has been warned that the CPU is getting too hot, the overtemperature circuit may then also send a signal to a timer (in a block 500). A predetermined period of time will pass (in a decisional block 510). If no action has been taken by the user within the appropriate time frame, the document will be stored in the disk (in a block 520) and the power soure to the CPU will be shut off (in a block 530) which ends the program (in a block 540).

It should be understood that the foregoing instructions and the method in which those instructions are executed may vary greatly depending on the use of the particular PC and the environment in which it will be operating. Accordingly, it is not intended to limit the method of operation to the preferred embodiment described above.

In a preferred manufacturing method of the present invention, a printed wiring board ("PWB") with the thermistor trace of the present invention is formed by conventional processes. In some instances the trace may be sandwiched between two or more layers of the PWB. The trace is integrally etched in a serpentine pattern giving a length that will cover the maximum amount of square area occupied by the heat-producing component. Once the trace is formed, the heat-producing CPU component is conventionally attached to the board over the trace. A common power pin, which is located within the board's circuitry, is connected to both the CPU and the first end of the trace. To the second end of the trace is coupled an analog-to-digital converter circuit that is ultimately coupled to a overtemperature circuit.

The overtemperature circuit is conventionally coupled to a FLASH EEPROM. During manufacturing of the PC, the resistance of the trace is measured at ambient temperatures. This information is then "burned" into the FLASH EEPROM. As previously discussed, this information is then later used to determine the temperature of the CPU.

From the above, it is apparent that the present invention provides a system and method for monitoring the temperature of a heat-producing electronic component located on a circuit board and a method of manufacturing therefor. The system comprises: (1) an electrically-conductive trace of predetermined dimensions formed integrally with the circuit board, the trace having a temperature-dependent electrical property, a temperature of the electronic component affecting the electrical property and (2) an overtemperature detection circuit coupled to the trace for measuring the electrical property, the detection circuit providing, in response thereto, an overtemperature signal to thereby indicate that the temperature of the electronic component has exceeded a predetermined level.

Although the present invention and its advantages have been described in detail, it should be understood that various changes, substitutions and alterations can be made herein without departing from the spirit and scope of the invention as defined by the appended claims.

What is claimed is:

1. A computer system comprising:

a microprocessor;

a circuit board for supporting and coupling to said microprocessor;

an electrically conductive flat trace of predetermined shape formed on said circuit board, said trace having a temperature dependent electrical property;

means for mounting said microprocessor on said board adjacent to said trace;

temperature detection circuit coupled to said trace for measuring said electrical property of said trace;

means, coupled to said detection circuit, for providing a signal to indicate that said temperature of said trace has exceeded a predetermined level; and means for modifying the operation of said computer system in response to said overtemperature signal.

2. The system as recited in claim 1, wherein said detection circuit comprises said microprocessor.

3. The system as recited in claim 1, wherein said system is a personal computer which includes a clock signal generator and said means for modifying the operation of said computer system includes means for changing the output of said clock signal generator.

4. The system as recited in claim 1, wherein said temperature detection circuit comprises an analog-to-digital conversion circuit for converting said electrical property to a corresponding binary representation.

5. The system as recited in claim 1, further including a memory device and wherein said temperature detection circuit computes a temperature of said trace with reference to a physical constant stored in said memory device.

6. The system as recited in claim 1, wherein said system is a personal computer and said means for modifying the operation of said computer system includes means for changing the operation of said microprocessor.

7. The system as recited in claim 2, wherein said system is a personal computer which includes a clock signal generator and said means for modifying the operation of said computer system includes means for changing the output of said clock signal generator.

8. The system as recited in claim 3, wherein said means for modifying the operation of said computer system includes means for reducing operations of said microprocessor.

9. The system as recited in claim 4, wherein said system is a personal computer which includes a clock signal generator and said means for modifying the operation of said computer system includes means for changing the output of said clock signal generator.

10. The system as recited in claim 5, wherein said system is a personal computer which includes a clock signal generator and said means for modifying the operation of said computer system includes means for changing the output of said clock signal generator.

11. A computer system for monitoring the temperature of a heat-producing electronic component, comprising:

a circuit board for coupling to said heat-producing electronic component;

an electrically conductive flat trace of predetermined dimensions formed integrally with said circuit board;

a temperature detection circuit coupled to said trace;

means for determining a temperature of said trace as a function of an electrical current flow through said trace; and means for modifying the data operation of said electronic component in response to an output of said determining means.

12. The system as recited in claim 11, further comprising a central processing unit and wherein said temperature detection circuit comprises a series of instructions operable on said processing unit.

13. The system as recited in claim 11, wherein said temperature detection circuit computes a temperature of said trace with reference to a physical constant stored in a memory device associated with said system.

14. The system as recited in claim 11, wherein said electronic component is a microprocessor.

15. The system as recited in claim 11, wherein said system is a personal computer which includes a clock signal generator and said means for modifying the operation of said computer system includes means for changing the output of said clock signal generator.

16. The system as recited in claim 12, wherein said system is a personal computer which includes a clock signal generator and said means for modifying the operation of said computer system includes means for changing the output of said clock signal generator.

17. The system as recited in claim 13, wherein said system is a personal computer which includes a clock signal generator and said means for modifying the operation of said computer system includes means for changing the output of said clock signal generator.

18. The system as recited in claim 14, wherein said system is a personal computer which includes a clock signal generator and said means for modifying the operation of said computer system includes means for changing the output of said clock signal generator.

19. A computer system, contained within an enclosure, comprising:

a microprocessor for executing software instructions;

a circuit board for supporting and coupling to said microprocessor;

an electrically conductive flat trace of predetermined shape formed on said circuit board, said trace having a temperature dependent electrical property;

selectively operable means for mounting said microprocessor on said board adjacent to said trace;

means for inducing air flow through said enclosure;

temperature detection circuit coupled to said trace for measuring said electrical property of said trace;

means for providing a signal to indicate that said temperature of said trace has exceeded a predetermined level; and means for modifying the data processing operations of said computer system in response to said overtemperature signal.

20. The system as recited in claim 19, wherein said detection circuit comprises said microprocessor.

21. The system as recited in claim 19, wherein said system is a personal computer which includes a clock signal generator and said means for modifying the operation of said computer system includes means for changing the output of said clock signal generator.

22. The system as recited in claim 19, wherein said means for modifying the operation of said computer system includes means changing the operation of said air flow inducing means.

23. The system as recited in claim 19, further including a memory device and wherein said temperature detection circuit computes a temperature of said trace with reference to a physical constant stored in said memory device.

24. The system as recited in claim 20, wherein said system is a personal computer which includes a clock signal generator and said means for modifying the operation of said computer system includes means for changing the output of said clock signal generator.

25. The system as recited in claim 22, wherein said system is a personal computer which includes a clock signal generator and said means for modifying the operation of said computer system includes means for changing the output of said clock signal generator.

26. The system as recited in claim 23, wherein said system is a personal computer which includes a clock signal generator and said means for modifying the operation of said computer system includes means for changing the output of said clock signal generator.

27. The system as recited in claim 19, wherein said means for modifying the operation of said computer system includes means for reducing the number of executions of software instructions by said microprocessor.

* * * * *